Oct. 25, 1966
F. D. MOSS
3,281,386
PROCESS FOR THE PREPARATION OF SYNTHETIC RUBBER LATEX
Filed Sept. 18, 1963
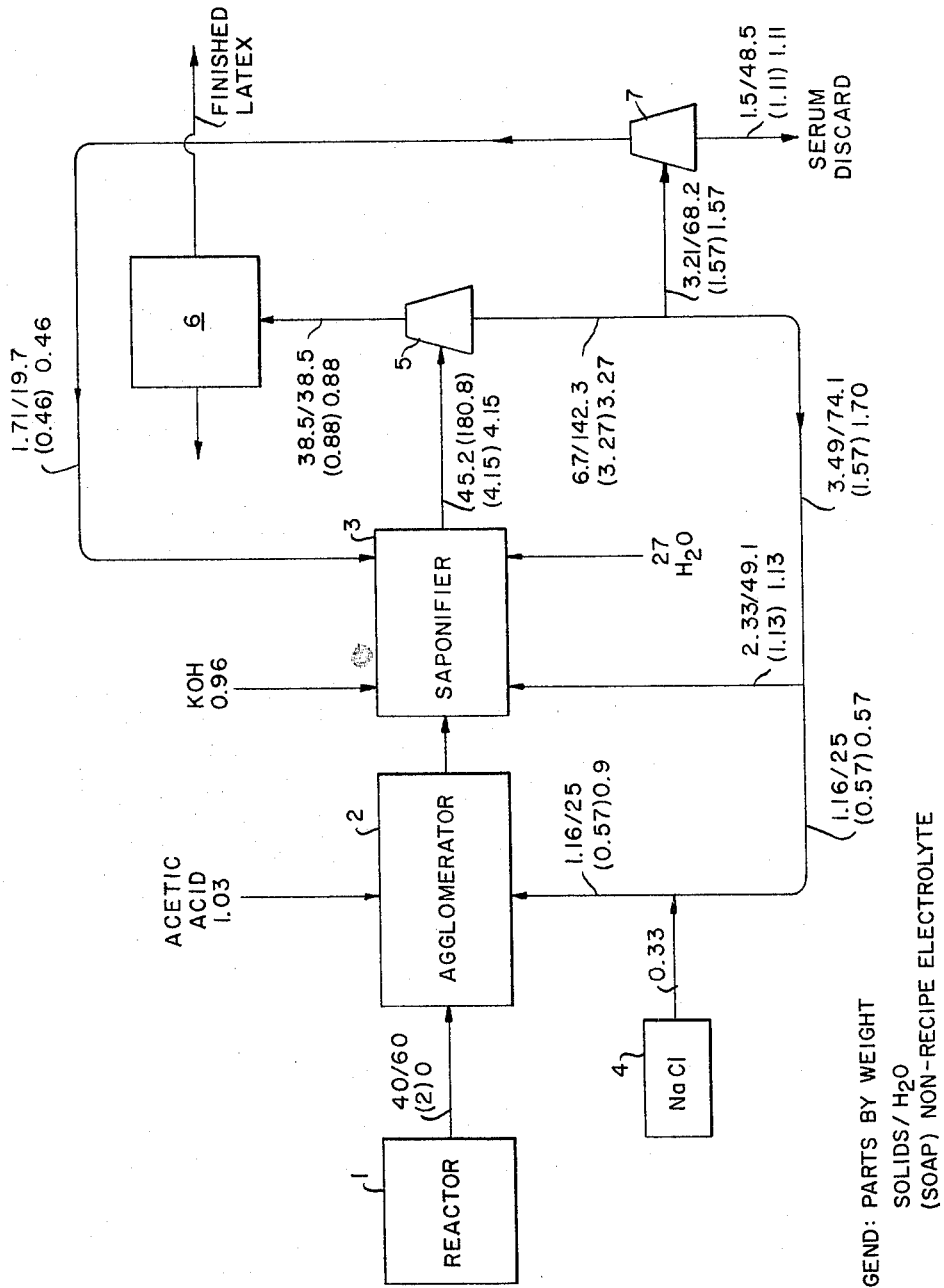
INVENTOR:
FRED DUDLEY MOSS
BY: William H. Myers
HIS AGENT

3,281,386
PROCESS FOR THE PREPARATION OF SYNTHETIC RUBBER LATEX
Fred Dudley Moss, Long Beach, Calif., assignor to Shell Oil Company, New York, N.Y., a corporation of Delaware
Filed Sept. 18, 1963, Ser. No. 309,645
7 Claims. (Cl. 260—29.7)

This invention relates to increasing the particle size and concentration of synthetic rubber latices. More particularly, it relates to a process for preparing concentrated latices having improved viscosity characteristics.

It is known to reduce the pH of synthetic rubber latices containing soap emulsifiers whereby the soap partially reacts with the acidic material used, to produce free soap-forming acid, thereby partially destabilizing the system and causing the agglomeration of the dispersed rubber particles into particles of larger size. The pH of the latex may be raised after such increase in particle size to improve the stability of the latex. The addition of certain salts is also known to increase the particle size of latices. Numerous other processes are known to cause a limited increase in particle size of latices but in many instances these processes are limited in the extent of their effect upon particle size because of their tendency to cause excessive coagulation of the latex. Since latices comprise a delicate balance of rubber particles, water and emulsifiers, the colloidal aspects of the system must be adjusted with great care to avoid massive coagulation during any treatment where the object is to produce latex particles of increased diameters.

One of the phenomena involved in this area comprises so-called "creaming," by which is meant the agglomeration of latex particles to such an extent that a phase containing most of the rubber particles separates from a "serum" comprising a large portion of the aqueous phase of the original latex but still containing a minor amount of the rubber. In previous processes, the amount of rubber contained in the serum as well as the latex chemicals otherwise, as more fully discussed hereinafter, are regarded as lost since the serum is generally sent to waste or a separate step is required for recovering components therefrom.

It is an object of the present invention to provide improved synthetic rubber latices. It is another object of the invention to provide a process for the preparation of such latices. It is a particular object of the invention to provide latices capable of being centrifuged. A further object of the invention is to provide a process wherein the recovery of rubber from a dilute latex is substantially quantitative. Further objects comprise the provision of concentrated latices having improved viscosity characteristics. Other objects will become apparent during the following description of the invention.

Now, in accordance with the present invention, a process is provided for concentrating synthetic latices with effective recovery of substantially all of the rubber present in the original latex by utilization and recycling of the serum phase. The process comprises the several steps as follows:

(a) adding an aqueous serum as obtained in step (f) below of this process containing 0.5–5 phr. (parts by weight per 100 parts of rubber) of a destabilizing water soluble salt to the latex; said amount of salt being sufficient to effect a substantial increase in particle size of the latex but insufficient to cause massive coagulation thereof;

(b) adding sufficient water soluble lower fatty acid to bring the pH of the latex to between about 5.5 and 6.5;

(c) aging the acidified latex for ¼–2 hours at 20–40° C.;

(d) diluting the latex with further quantities of the aqueous serum obtained in step (f) below the result in a latex containing 15–25% by weight of solids;

(e) resaponifying the latex with a monovalent alkali to a pH of 8.5–11;

(f) centrifuging the so-treated latex, whereby a concentrated latex phase containing at least about 40% by weight of solids is separated from a serum phase containing less than about 5% by weight of solids and (g) recycling portions of the serum to steps (a) and (d) above.

The use of the serum for the purpose of dilution during the agglomerating steps of salting, acidification and resaponification prior to centrifuging results in a number of interlocking benefits. In the first place, the solids content of the serum with respect to synthetic rubber and non-rubber solids is utilized to a far greater extent than would be otherwise possible. Secondly, the use of the serum unaccountably results in being able to limit the extent of dilution necessary prior to resaponification and centrifuging thus reducing the load upon the centrifuge. The reuse of the solids present in the serum, comprising soap and salts in addition to polymer, reduces the requirement for injecting new material of these identities to a minimum.

The carefully balanced sequence of steps described above leads to the formation of agglomerated latex particles of sufficient size that centrifuging can be readily carried out. This is especially promoted by the presence of a minor proportion of hydrocarbon solvents or monomers such as butadiene and styrene which reduces the specific gravity of the latex particle and thereby enlarges the difference between the specific gravity thereof and that of the aqueous phase, thus facilitating the separation of serum from latex during the centrifuging operation.

The synthetic rubber latex may be an aqueous emulsion polymerizate of one or more butadienes-1,3; for example, butadiene-1,3, 2-methylbutadiene-1,3 (isoprene), 2,3-dimethyl-butadiene-1,3, piperylene, or a mixture of one or more such butadienes-1,3 with one or more other polymerizable compounds which are capable of forming rubbery copolymers with butadiene-1,3. For example, up to 70% by weight of such mixture may be added of one or more monoethylenic compounds which contain a $CH_2=C<$ group where at least one of the disconnected valences is attached to an electro-negative group; that is, a group which substantially increases the electrical dissymmetry or polar character of the molecule. Examples of compounds which contain a $CH_2=C<$ group and are copolymerizable with butadienes-1,3 are aryl-substituted olefins, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ether, methyl vinyl ketone; vinylidene chloride. Such a synthetic rubber latex may be termed a "polybutadiene synthetic rubber latex."

The latex used as the starting material in the process of this invention usually contains from 2 to 10 phr. (parts of soap per hundred parts of rubber) and has a pH from about 8 to about 11. The particle size of the latex used in starting the process is too small for efficient centrifuging and at the same time more dilute than desirable for commercial utilization. It is obvious that the more water present in the latex, the more expensive per part of rubber it is to transport the same to its point of use. Furthermore, the viscosity-concentration specifications of customers for such latices are stringent and are rarely met by latex as it is normally produced in aqueous emulsion polymerizations. Normally, by the time the latex is concentrated enough to meet that part of the specification, the viscosity has reached an excessive value which is often unacceptable.

The precise particle size will depend upon a number of factors not forming a part of the present invention, such as the percentage of soap, the identity of the synthetic rubber, the rate of polymerization, and other factors all of which result in the described unsatisfactory situation. The objectives therefore, are first to agglomerate the relatively small particles and secondly, to eliminate a substantial portion of the water present in the latex preferably together with a large part of a non-elastomer solids present in the original composition or added during agglomeration. The treatments are confined by the colloidal restrictions placed upon this system which, unless due precautions are taken, result in massive coagulation of the elastomer.

The present process is designed to promote agglomeration without coagulation and at the same time to devise a more economic process for achieving these dual purposes than has heretofore been proposed. The soap content of the ordinary synthetic rubber latex to be used in the process of this invention normally will lie between 5 and about 8 phr. (parts by weight per hundred parts elastomer). The pH of the latex at this stage will usually be between about 8 and 11 and the concentration of elastomer in the dilute latex will usually be between about 35 and 40%.

The process of the invention will be described particularly with reference to the figure which illustrates a preferred set of apparatus for carrying out the process. According to the figure, a dilute latex is prepared such as in reactor 1 and passes to agglomerator 2 wherein the first stages comprise adjustment of the solids content of the latex to be between about 30 and about 35% followed or accompanied by "salting" with an alkali metal halide such as sodium chloride; thereafter by acidification, preferably during a heating period. The latex is then held for a length of time sufficient to encourage agglomeration of the destabilized and acidified latex which is thereafter either saponified in the same vessel or sent to a saponifying vessel 3 wherein the latex is again diluted and an alkali metal base added to resaponify acid present in the system.

Each of these dilution stages is accomplished by the essential aid of serum obtained in the process and, if necessary, by the addition of further water. The serum utilized contains minor residual portions of elastomer as well as substantial proportions of salts formed in or contained in the serum. The process may also include the addition of salt from an extraneous source 4. The latex, now having been diluted to a substantial degree and containing between about 15 and about 25 parts by weight of elastomer based on the total diluted latex is now sent to a centrifuge 5 wherein the agglomerated latex particles are separated from the serum, the latter being recycled for use in the agglomerator or saponifier as described hereinabove.

Alternatively, portions of the serum may be sent to a second stage centrifuge 7 for further separation of latex-containing serum which is then recycled back into the process, the balance of the serum being sent to discard. The recovered agglomerated latex may then, if necessary, be sent to a stripper 6 for the removal of any solvent or monomer present in the system and also for removing by evaporative means a calculated proportion of water to result in a still more concentrated latex.

The salt injected into the agglomerator preferably comprises an alkali metal salt of substantial water solubility. These may be alkali metal halides, preferably sodium chloride or potassium chloride. They may, however, be supplemented by alkali metal salts contained in the serum which will be either an alkali metal halide or an alkali metal salt of a water soluble fatty acid such as for example potassium acetate, sodium acetate and the like. Any added salts may be injected directly into the agglomerator or may be dispersed in the recycled serum prior to the latter reaching the agglomerator. The proportion of salt will be that required for destabilizing the latex (together with acid) while at the same time avoiding massive coagulation. The proportion will normally be between about 0.5–5 phr. of total salts. The latex is diluted with serum during the agglomeration stage or prior thereto to about between 25% and 35% total solids. A water-soluble fatty acid such as fatty acids having from 1 to 4 carbon atoms per molecule is added to the salted latex until the pH of the system is between about 5.5 and 6.5 or in some cases 5.0–7.0. Acetic acid is typical.

The next stage in the process may be termed a holding or aging phase wherein the destabilized, acidified and salted latex is held for a period of time between about ¼ and about 2 hours at a temperature between about 20 and 40° C. to permit the latex particles to agglomerate to their greatest extent. It is preferred that the latex be heated prior to acid addition to a temperature above about 25° C. and preferably between about 30 and 40° C., since at these elevated temperatures the danger of coagulation upon acidification is minimized.

Following the holding period, the latex is transferred to the saponifier, wherein the total solids are adjusted by serum and/or water addition to between about 15 and 25% total solids. The precise proportion of recycled serum and of fresh water (if any) will depend upon all of the related factors concerning the salt content of the serum, the salt requirements for agglomeration, the amount of serum which may be injected and the extent of dilution required.

Following dilution with serum, the diluted latex is restabilized by the addition of an alkali metal base such as potassium or sodium hydroxide used in sufficient quantity to raise the pH of the latex to between about 8.5 and 11. If this resaponification is omitted, the subsequent step of concentrating by centrifuging the latex will result in massive coagulation. Resaponification results in the formation of soap imparting greater stability to the dilute latex.

One of the important aspects of the recycle of serum to the stage of the process prior to centrifuging comprises the maintenance of a relatively higher solids level in the latex than when utilizing fresh water as the sole diluent. This is required, since dilution by recycle serum to lower levels does not result in effective electrolyte rejection during the centrifuging. However, the limitation is a benefit in respect to the efficiency caused by centrifuging this relatively more concentrated latex since the amount of serum rejection is correspondingly reduced and the required centrifuge capacity is less. Retention of the electrolyte in the aqueous phase and consequently in the concentrate is adjusted by the amount of fresh water added to the system. The controlling factor will be the electrolyte tolerance of the final concentrated latex. Some flexibility is available in the salting step, where higher solids and lower electrolyte may be manipulated to yield the same particle size.

Having now agglomerated the latex particles as much as possible, and created particles of over about 7500 Angstrom units in average diameter, the latex is in condition for concentration by centrifuging. It is sent to a centrifuge wherein a concentrated latex phase is separated from a serum phase, the latter containing no more than a minor proportion of the elastomer based on the total elastomer content. This serum is thereafter recycled either to the agglomerator or to the saponifier, optionally going to a second stage centrifuge for further separation of serum for discard from a more concentrated phase containing residual proportions of elastomer and salt which can if desired be recycled as part of the recycled serum.

The concentrated latex, comprising more than about 40% by weight of solids, may contain some monomer left from the polymerization reaction by which the emulsion polymer was originally derived or may still contain some solvent, if any was utilized in the polymerization procedure. The presence of either of these components aids in the centrifuging step since they create a larger specific gravity difference between aqueous serum phase and the latex particles. Consequently, they are a benefit in the process of the present invention but now ordinarily should be removed by stripping. In the stripping operation, carried out in vessel 6 of the figure, monomer and/or solvent are removed overhead usually with appreciable amounts of water for reducing the proportion of the aqueous phase of the latex. This results in a concentrated latex which normally contains greater than 50% by weight of elastomer and preferably greater than about 65% by weight of elastomer.

The concentrated latices produced by the process of the present invention have been found to meet both the concentration and viscosity requirements of customers especially for production of foam rubber articles. Latices produced by this process have a higher solids content at acceptable latex viscosities. The products also have a greater froth fluidity which permits easier filling of molds as well as exhibiting less foam shrinkage and shorter gel time. The gel times are in fact usually less than half the gel time required for latices of a lower elastomer content. Since the centrifuging operation results in removal of a large proportion of a non-rubber solids such as salts and the like, the resulting concentrated elastomer is capable of greater compounding flexibility than heretofore. The use of the recycle operation according to the process of the present invention results in a material economic advantage over that experienced by discarding the serum and injecting fresh salt and water for the purpose of agglomeration and dilution during the described agglomerating and saponifying steps of the process. The ability to utilize more concentrated latices prior to centrifuging also constitutes a material economic advantage since the volume of latex to be centrifuged is correspondingly diminished.

In the process of this invention the agglomeration of a latex particle is accomplished by the delicate adjustment of the colloidal system so as to create particles large enough for effective centrifuging but not as large as to cause excessive coagulation. The precise average particle size diameter will depend upon the amount of salt added either as serum solids or as new salt as well as upon the latex solids prior to salting. The optimum particle size has been found to be between about 0.75 and 1.8 microns. The latex solids prior to salting are between about 33.5 and 38% and the salt added to the latex is between about 2.4 and 3 phr.

The following example illustrates the process of the present invention and shows the high recovery possible due to the recycle of serum for dilution purposes as well as for recovery of the minor amount of elastomer contained in the serum phase. In the example, 100 lbs. of styrene-butadiene latex comes from a reactor and contains 2 lbs. of tall oil mixed rosin acid/fatty acid soap, miscellaneous recipe components, including electrolyte and polymer, all adding up to about 40 lbs. of solids. This is diluted with recycle serum. Potassium acetate results from the acetic acid acidification and potassium hydroxide neutralization plus other added electroyltes (sodium chloride). The figure shows the material balance of the various streams including the original latex containing 2% soap being sent to the agglomeration zone, being diluted with serum which contains both soap and electrolyte further modified with added sodium chloride, thereafter sent to the saponification zone 3 wherein it is further diluted with serum and water; acetic acid and potassium hydroxide are added in zones 2 and 3 respectively.

A holding period of 1 hour at 34° C. after addition of acetic acid in zone 2 permitted equilibrium and agglomeration to be achieved. The addition of potassium hydroxide in zone 3 caused the pH to be raised to 10.6 from a pH of 6 in zone 2 after the addition of acetic acid. The resaponified latex diluted with serum as shown was then sent to the centrifuge 5 wherein a 50% concentrated latex was removed and sent to the stripper 6. Residual monomer from the original polymerization was removed in the stripper together with sufficient water to result in a latex having about 72% solids and a viscosity of 500 centipoises. A portion of the serum was sent to a secondary centrifuge 7 for further recovery of residual dispersed polymer contained therein, the recovered minor proportions of latex being recycled to zone 3 and a serum discard being removed as shown.

I claim as my invention:

1. The process of concentrating a synthetic latex containing 10–35% solids prepared by the polymerization of a conjugated diolefin of from 4 to 6 carbon atoms per molecule in aqueous emulsion in the presence of soap emulsifier which comprises the steps:
   (a) adding an aqueous serum as obtained in step (f) of the process containing 0.5–5.0 phr. of a destabilizing water-soluble salt of the group consisting of alkali metal halides and alkali metal salts of water-soluble fatty acids to the latex; said amount of salt being sufficient to effect a substantial increase in particle size of the latex but insufficient to cause massive coagulation thereof;
   (b) adding sufficient water-soluble lower fatty acid having 1-4 carbon atoms per molecule to bring the pH of the latex to 5.5–6.5;
   (c) aging the acidified latex for ¼–2 hours at 20–40° C;
   (d) diluting the latex with aqueous serum as obtained in step (f) of the process to 15–25% solids;
   (e) resaponifying with an monovalent alkali to a pH of 8.5–11;
   (f) centrifuging the so-treated latex, whereby a concentrated latex phase containing at least about 40% solids is separated from a serum phase containing less than about 5% solids;
   (g) and recycling portions of serum to steps (a) and (d).

2. A latex concentration process according to claim 1 wherein the latex feed to the process contains 5–20% by weight of monomeric hydrocarbon.

3. A process according to claim 2 wherein the concentrated latex of step (f) is subjected to stripping and concentration whereby monomeric hydrocarbon and water are removed and a latex containing at least about 60% solids is obtained.

4. A process according to claim 1 wherein the destabilizing salt is sodium chloride.

5. A process according to claim 1 wherein the fatty acid is acetic acid.

6. A process according to claim 1 wherein the latex polymer comprises at least one copolymer of a conjugated diolefin and a vinyl aromatic hydrocarbon.

7. A process according to claim 6 wherein the latex polymer is at least one styrene-butadiene copolymer.

References Cited by the Examiner

UNITED STATES PATENTS

| | | | |
|---|---|---|---|
| 2,444,801 | 7/1948 | Arundale | 260—29.7 |
| 2,936,295 | 5/1960 | Brodkey et al. | 260—29.7 |

MURRAY TILLMAN, *Primary Examiner.*

J. ZIEGLER, *Assistant Examiner.*